Nov. 14, 1961　　　　　L. CLEMENS　　　　　3,008,662
MACHINE FOR THE MANUFACTURE OF SUPERPOSED
LAYERS OF FIBROUS MATERIALS
Filed April 8, 1959　　　　　　　　　　2 Sheets-Sheet 1
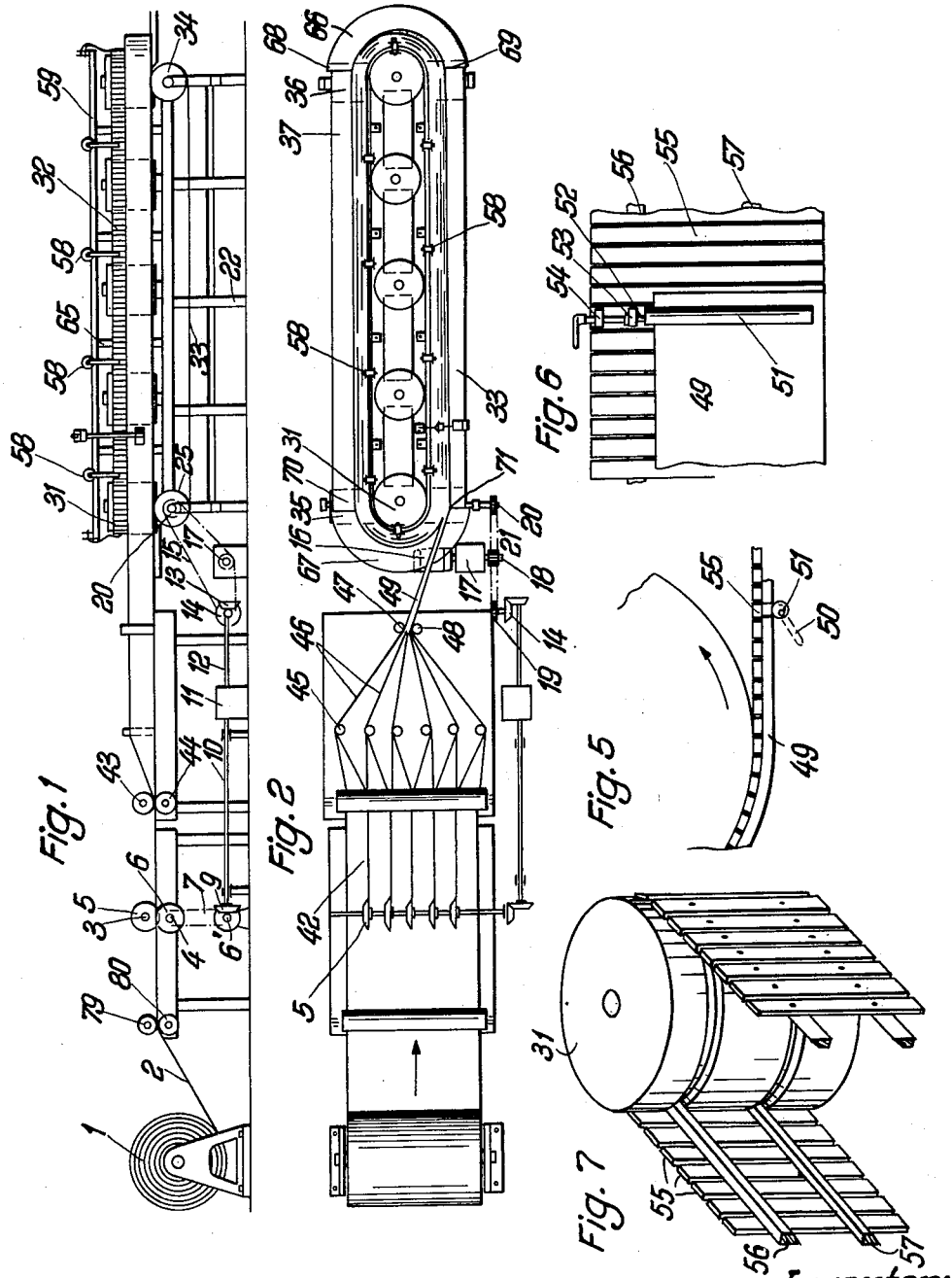
Inventor:
Ludwig Clemens, Nov. 14, 1961     L. CLEMENS     3,008,662
MACHINE FOR THE MANUFACTURE OF SUPERPOSED
LAYERS OF FIBROUS MATERIALS
Filed April 8, 1959     2 Sheets-Sheet 2

Inventor:
Ludwig Clemens,

United States Patent Office 3,008,662
Patented Nov. 14, 1961

3,008,662
MACHINE FOR THE MANUFACTURE OF SUPERPOSED LAYERS OF FIBROUS MATERIALS
Ludwig Clemens, Wilhelmstrasse 44/46,
Wiesbaden, Germany
Filed Apr. 8, 1959, Ser. No. 804,897
Claims priority, application Germany July 29, 1958
4 Claims. (Cl. 242—67.1)

This invention relates generally to the manufacture of fibrous sheets, and relates more particularly to a machine for manufacturing superposed layers of fibrous material, such as, for example, corrugated paper or corrugated cardboard.

It is well known to utilize packing materials, for packaging sensitive or delicate wares which consist of cut boards, sheets or plates of fibrous materials such, for example, as corrugated paper or corrugated cardboard. In order to ship such packing materials conveniently, it has been proposed to stack them in superposed sheets. To this end there has been proposed to cut a relatively wide and long sheet of the material into a large number of individual longitudinal strips which are then twisted or turned through 90° and superposed flat upon each other to produce thus stacked layers of the material. These stacked layers were fed to a winding device where a plurality of layers of such strips were wound one upon the other. After a sufficient thickness of the wound up layers of starting material had been obtained, the thus formed skein-like layers were cut at one place. Thereafter, the skein-like layers were, if desired, supplied with a cover and then they were cut into individual packages by a transverse cutting device, thereby to obtain individual layers of the starting material stacked upon each other.

It is, accordingly, among the principal objects of the instant invention to provide a machine for manufacturing such skein-like layers of fibrous materials which is characterized by its great simplicity of construction, trouble-free operation, great flexibility and being capable of adjustment to different starting materials.

The above advantages are obtained by the machine of the instant invention by providing a track for the material to be wound upon itself. This track for the material includes a plurality of guide cylinders which are vertically disposed and at least one of which is driven. The track for the material further includes a number of vertical rods which are flexibly interconnected in the manner of a "Venetian blind." Furthermore there is provided a feeding or advancing device which is disposed on both sides of the track and immediately adjacent thereto. This feeding device preferably comprises endless bands which are guided by rolls, one of which is driven to provide a mechanism to support the lower edges of the material to be wound. The feeding device is driven at a somewhat greater velocity than the Venetian blind band which is disposed vertically.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, illustrating a preferred embodiment of the invention, and in which:

FIG. 1 is a schematic side elevational view of a machine in accordance with the invention cooperating with a known sheet cutting device;

FIG. 2 is a plan view of the machine of FIG. 1;

FIG. 5 is a fragmentary plan view of a portion of the machine shown in FIG. 4 and illustrates how the starting end of the strip of material to be wound is secured to the machine of the invention;

FIG. 6 is a fragmentary side elevational view of the holding device illustrated in FIG. 5; and FIG. 7 is a fragmentary perspective view showing a modified detail.

Figure 3:
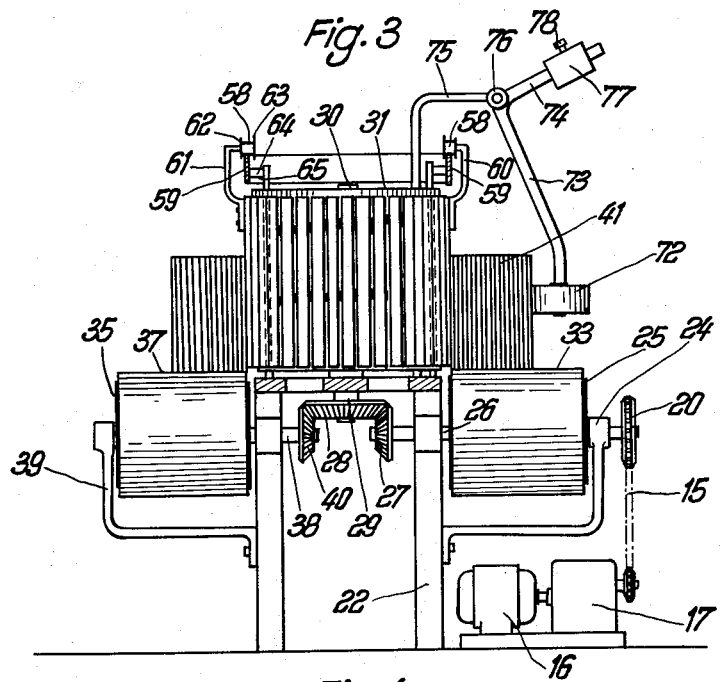
FIG. 3 is an enlarged front elevational view of the machine of the invention.
Figure 4:
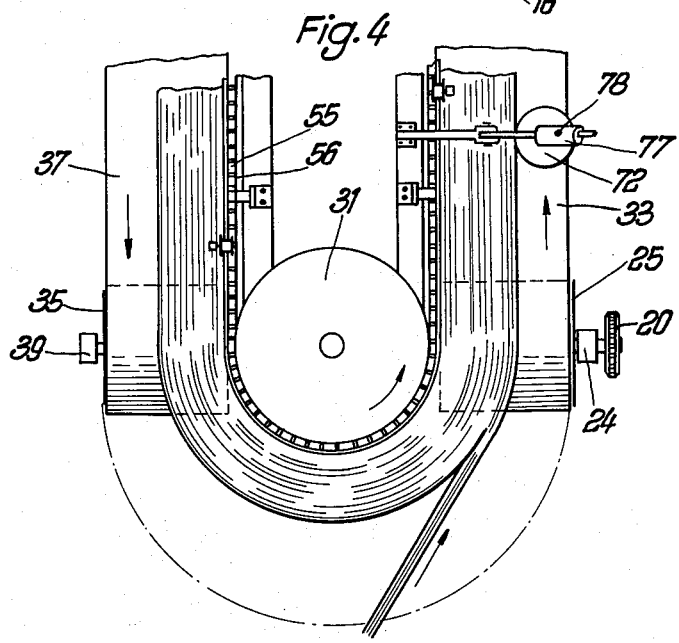
FIG. 4 is a fragmentary plan view of the portion of the machine illustrated in FIG. 3.

As illustrated particularly in FIGS. 1 and 2, the material 2 to be wound which may, for example, be a corrugated paper, is wound from a supply roll 1. From the supply roll 1 the material 2 is fed by mechanically driven rotating feed rolls 79 and 80 to a known longitudinal cutting device including cutters or cutting knives 5 and 6. The disc-like cutting knives 5 and 6 are secured to shafts 3 and 4 which are disposed transverse to the direction of movement of the material 2. The shafts 3 and 4 of the knives are driven by a chain 7 and an associated chain wheel by means of a shaft supporting a bevel gear 6'.

The bevel gear 6' meshes with a bevel gear 9 secured to a shaft 10 which is fixedly journalled and disposed parallel to the direction of movement of the material 2. The shaft 10 is coupled to a gear box 11 which has a steplessly variable transmission ratio, as is well known to those skilled in this and related arts. The gear box 11, in turn, is driven by a shaft 12. The shaft 12, by virtue of a pair of bevel gears 13, 14, is in driving connection with a chain 15 which is driven by a driver 18. The driver 18 is secured to the output shaft of a second gear box 17 having a variable transmission ratio that may selectively be adjusted manually and being driven by an electric motor 16. The chain 15 moves over the chain wheel 19 as well as over the chain wheel 20 which, in turn, furnishes the drive for the rotating portion of the winding device which forms the subject matter of the instant invention.

As illustrated particularly in FIG. 3, the chain wheel 20 is secured to a shaft 26 which is journalled in the machine frame 22 as well as in an angle support 24 that is secured to the frame 22 and forms part of the winding device of the invention. The shaft 26 has secured thereto a cylinder 25 over which there moves an endless guide band 33 that preferably comprises a flexible, elastic material such as rubber. This guide band 33 moves in a horizontal direction along the frame 22 of the winding device. The other portion of the guide band 33 opposite the cylinder 25 moves about a cylinder 34 of equal size which, however, is not driven and which is journalled in the machine frame 22 similar to the manner the cylinder 25 is journalled in the frame. The guide band 33 serves the purpose of supporting and feeding the lower edge of the layers 41 of the material to be wound by the winding device. The material to be wound is fed to the winding device in the form of a band 49 composed of the individual longitudinal strips 46 stacked upon each other.

On the other long side of the machine frame 22 of the winding device opposite the horizontal guide band 33, there is disposed in a similar manner another guide band 37 which is similar to the guide band 33 but which has an upper surface supporting the material to be wound which moves in a direction opposite to the upper surface of the guide band 33.

For the purpose of effecting this movement of the guide band 37, the drive cylinder 35 of this band is secured to a shaft 38 that is journalled horizontally in the machine frame 22 and in an angle support 39 which is secured to the frame. The portion of the shaft 38 which extends into the interior of the machine frame 22 supports a bevel gear 40 secured thereto. The bevel gear 40 meshes with a bevel gear 28 that is secured to a shaft 29 which is journalled vertically in the machine frame 22. The bevel gear 28, in turn, meshes with the bevel gear 27 which is fixed to the portion of the shaft 26 that extends into the interior of the machine frame 22, the shaft 22 being driven by the chain gear 20 and supporting the cylinder 25.

The shaft 29 which supports the bevel gear 28 may, in accordance with the invention, be arranged to serve at the same time as the shaft 30 which is secured to a vertically disposed guide cylinder 31 for the vertical guide band 32 which, in accordance with the invention, is composed of the straps 56, 57 to which there are secured the rods 55 forming a "Venetian-blind" band.

The Venetian blind band 32 moves, in a well known manner, over five cylinders 31 which are disposed in a row. The cylinders 31 are all rotatably journalled in the machine frame 22. By way of example, the cylinders may comprise wooden belt pulleys which may either be disposed adjacent each other or may be spaced from each other and which have grooves at their outer peripheries for receiving the endless straps 56, 57. Thus the Venetian-blind band 32 is supported and guided by the cylinders 31.

In order to support the weight of the Venetian-blind band 32 and to reduce the load acting on the bands or straps 56, 57 which support this weight and which are, in turn, supported by the guide cylinders 31, there may be provided a closed guide rail 59 that extends about the machine frame and is disposed above the upper, outer end of the band 32. The guide rail 59 may be composed, for example, of a section strip iron secured to a number of vertically disposed support columns 65.

Support rolls 58 provided with flanges 62 and 63 are movable along the guide rail 59. The support rolls 58 are rotatably journalled on bent-over ends of curved members 60, 61. The members 60, 61, in turn, are connected to individual rods 55 such as by rivets, screws, by glue or the like, and the thus supported rods of the Venetian blind band being about equally spaced from each other along the band 32. As a result, the Venetian blind band is suspended in such a manner by the support rolls 58 and the guide rail 59 that the straps 56, 57 supporting the rods 55 are relieved while at the same time sagging of the Venetian-blind band due to its own weight in the spaces between adjacent guide cylinders is substantially prevented.

At the two narrow sides of the machine frame 22 and in the space between the two horizontal guide bands 33, 37, the material 41 to be wound is supported by plane, horizontal platforms or supports 66, 67 which are fixedly secured to the machine frame and which have a semi-circular shape so that the material slides over the smooth surfaces thereof.

The supports 66, 67 have their outer edges 68, 69 disposed closely adjacent the outer edge lines of the guide cylinders 25, 35, 36 of the guide bands 33, 37.

Depending on the prevailing working conditions, the drive of the guide bands 33, 37 may be effected at a speed which may deviate from the circumferential speed of the band 32. The drive is accomplished by the drive means previously mentioned, including the motor 16, the shafts 26, 29 and 38, and the bevel gears 27, 28 and 40; the bevel gears 27 and 28 are so dimensioned that the desired speed differential is obtained between the guide bands 33 and 37 on hand, and on the other hand the Venetian blind band 32. In this manner it is possible to exert a certain tension on the material while it is wound on the band 32, which promotes the formation of a multiple layer which is tightly wound upon each other.

Again for the purpose of regulating the tension with which the strips of material 49 are wound upon each other, there are provided one or more press rolls 72 which are rotatably journalled at the free ends 73 of one or more angle levers 73, 74. The angle levers 73, 74 are tiltably mounted on angle-shaped supporting arms 75 which, in turn, are rigidly connected to the machine frame 22. The free ends of the arms 74 of the angle levers 73, 74 are provided with counter weights 77 which may be adjustable by means of set screws 78 to control the required pressure exerted by the rolls 72. When the wound material 41 is to be removed from the winding device, the press rolls 72 may simply be moved away from the path of the material by lifting and tilting back the arms 74.

In order to adjust the speed of the cutting device 5, 6 depending on the characteristics and dimensions of the material to be wound, the variable gear box 11 is disposed between the main drive 16, 17 and the longitudinal cutting device 5, 6. The over-all working speed of the winding device is controlled by adjustment of the number of revolutions of the drive motor 16, or by controlling the transmission ratio of the gear box 17.

The beginning or starting end of the strip 49 to be wound upon the band 32 is secured in a simple manner by the device illustrated in FIGS. 5 and 6. This device includes a roll 51 which is rotatably mounted in bearings 54, 53. The bearings 54, 53 are secured to one of the rods 55 and the roll 51 is rotatable by means of a hand lever 50. The roll 51 is either mounted eccentrically with respect to its shaft 52, or else the shaft may be secured to eccentrics which may be swung or partially rotated by means of the hand lever 50. By operation of the hand lever 50, the roll 51 may be moved either into closer proximity or farther away from the surface of the rod 55 to which it is journalled. Accordingly, the starting end of the band 49 may be pressed by the roll 51 against the surface of the rod 55 or may be made freely movable. The eccentricity between the surface of the roller 51 and the bearing 53, 54 of the shaft 52 is so proportioned that by rotation of the lever 50 on the material band may be jammed so that it is taken along on its travel by the Venetian-blind band 32.

The winding device of the invention and its associated mechanism operates as follows:

After the material is secured to the Venetian-blind band 32, the main drive 16 may be started to drive the cutting knives 5, 6 which cut the starting material into suitable longitudinal strips. The individual strips 46 are then twisted through 90° and superposed by the rolls 45, 47, 48 and fed into the winding device of the invention. The roll 31 is also driven by the main drive 16 to move the straps 56, 57 of the Venetian-blind device, and hence the longitudinal strips 46 are eventually wound about the band 32. The support bands 33, 37 are also driven by the main drive 16 and may move at a higher speed than the band 32, as explained before. The purpose of driving the bands 33, 37 at a higher speed is to provide for a tension to insure that the material is wound tightly upon itself. After the material has built up to the desired thickness, the main drive is stopped and the wound-up layers may be cut and further processed.

The rods 55 of the band 32 may be supported and interconnected by an endless band of a flexible material such as, for example, linen, rubber or the like, instead of using the two endless straps 56, 57. The rods may preferably be connected to the straps 56, 57 or to a linen band by gluing.

The straps 56, 57 may also have a rectangular or trapezoidal cross section. Preferably, they may be rubber V-belt, such as are sold in the trade (FIG. 7). In such a case, the grooves at the circumferences of the guide cylinders need to have a cross section corresponding to that of the rubber cone belts. The grooves which serve for the purpose of receiving the straps or V-belts 56, 57 may also be formed by the spaces remaining between individual portions of the guide cylinders. This is particularly suitable when the guide cylinders comprise several concentrically superposed belt pulleys of the type sold commercially.

The guide cylinders 23, 31, 25, 35, 36 may, if desired, be arranged for adjustment in a manner well known and not shown in the drawings in order to avoid confusion. This makes is possible to control the tension of the endless bands which move about these cylinders. Experience has shown, however, that such adjustment of the guide cylinders is not always necessary.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A machine, for use in the manufacture of superposed layers of fibrous materials, comprising, in combination, a first endless band, a row of uprightly disposed guide cylinders operable for supporting said first band, means operable for driving at least one of said guide cylinders for moving said first band in upright position through a horizontal path, said first band comprising a plurality of vertically disposed rods, flexible strap means operative for interconnecting said rods, a second and a third endless band, said second and third bands being disposed horizontally adjacent the sides of said first band and adapted for supporting the lower edges of the layers to be wound on said first band, rolls operable for guiding and supporting said second and third bands, and means actuatable for driving at least one roll of each of said second and third bands at a speed greater than that of said first band.

2. A machine, as claimed in claim 1, wherein each of said guide cylinders of said first band comprises a belt pulley, and a shaft driven from said drive means.

3. A machine, as claimed in claim 1, wherein said flexible strap means of said first band include a plurality of spaced, parallel, flexible straps of predetermined cross section, said rods being glued to said straps, and wherein said guide cylinders of said first band have, at their circumferences, grooves of a cross section arranged to receive said straps.

4. A machine, as claimed in claim 3, wherein said flexible straps include V-belts of rubber, and said grooves of said guide cylinders have a cross section dimensioned to receive said V-belts.

References Cited in the file of this patent
UNITED STATES PATENTS 1,363,441    Steele  ---------------- Dec. 28, 1920